United States Patent [19]

Sennema et al.

[11] Patent Number: 5,249,180
[45] Date of Patent: Sep. 28, 1993

[54] DIGITAL DATA PACKET SWITCHING MODULE FOR ALLOCATING EMPTY PACKETS TO A CROSSPOINT SWITCH

[75] Inventors: Ronald T. Sennema, Utrecht; Eric Weldink, Hilversum, both of Netherlands; Wolfgang Kowalk, Norderstedt, Fed. Rep. of Germany

[73] Assignee: AT&T Bell Laboratories, Murray Hill, N.J.

[21] Appl. No.: 675,589

[22] Filed: Mar. 26, 1991

[30] Foreign Application Priority Data

Apr. 2, 1990 [NL] Netherlands ................. 9000765

[51] Int. Cl.⁵ ............................................. H04L 12/56
[52] U.S. Cl. .................................... 370/60; 340/825.89
[58] Field of Search .................... 370/60, 94.1, 85.6, 370/85.1, 85.9, 85.11, 85.2, 60.1, 61, 67, 68; 340/825, 5, 825.51, 825.89, 825.87, 825.03

[56] References Cited

U.S. PATENT DOCUMENTS

| | | |
|---|---|---|
| 4,754,451 | 6/1988 | Eng et al. ........................... 370/60 |
| 4,821,258 | 4/1989 | Fraser ................................ 370/60 |
| 5,042,032 | 8/1991 | Dighe et al. ....................... 370/60 |
| 5,140,582 | 8/1992 | Tsuboi et al. ..................... 370/60 |

FOREIGN PATENT DOCUMENTS 0299473 1/1989 European Pat. Off. .

*Primary Examiner*—Douglas W. Olms
*Assistant Examiner*—Dang Ton
*Attorney, Agent, or Firm*—Barry H. Freedman

[57] ABSTRACT

A switching module comprises input buses (1—1, ... 1-n) and at least one output bus (2-ij), in which each input bus, for data packet transmission, is connected to the output bus by means of a crosspoint switch (4-i). Each crosspoint switch (4-ij) has a unique address and a request output (61) for sending out a request signal. The switching module further includes allocation means (3-j) which place empty packets having the unique address of a crosspoint switch (4-ij) onto the output bus (2-j). The allocation means (3-j) comprise recording means (105,201) for receiving the request signals and include a FIFO (107,206) for storing representatives of the unique crosspoint switch addresses that are derived from the request signals. The allocation means (3-j) further include a packet generator (103) for deriving addresses from the representations from the queue store (107,206) and allocating these addresses to the empty packets.

3 Claims, 6 Drawing Sheets

DIGITAL DATA PACKET SWITCHING MODULE FOR ALLOCATING EMPTY PACKETS TO A CROSSPOINT SWITCH

BACKGROUND OF THE INVENTION

1. Field of the Invention

The invention relates to a digital data packet switching module, comprising a plurality of input buses and at least one output bus, crosspoint switches connecting each individual input bus to the output bus, each crosspoint switch comprising a writing circuit that is connected to the output bus to write packets into empty packets on the output bus, and allocation means for solving access conflicts between packets intended to be transferred to the same output bus within the same packet interval.

2. Description of the Related Art

A switching module of this type is known from U.S. Pat. No. 4,821,258. The switching module set out in that patent is used in a telecommunication network for packet switching. When packets are switched in the switching module, access conflicts may arise when packets are to be transmitted over a plurality of input buses within the same packet interval.

In the switching module as claimed in said United States Patent the allocation means for solving access conflicts comprise a First-In-First-Out (FIFO) queue store per input bus followed by a code generator. This code generator provides each packet with a column code on the basis of origin and/or destination, which code corresponds with the output bus (column) to which the packet is to be transmitted. The code generator likewise produces a priority code, also on the basis of origin and/or destination. In each packet interval the priority codes of the packets that have to be transmitted to the same output bus are mutually compared per output bus and the packet having the highest priority is transmitted. Nothing can be derived from the above patent about the packets having a lower priority.

The switch function, switching packets over from the input buses to the output bus in the order they come in, is also referred to as a method according to the strict FIFO (First-In-First-Out) principle. A feature of the strict FIFO principle is that the probability of delay and loss is the same for each packet. Also if the method according to the strict FIFO principle is implemented, the probability of delay and loss of a packet is smaller with a constant packet supply than with another switching method.

It is an object of the invention to provide a switching module approximating the strict FIFO principle for transmitting the supplied packets from the input buses to the output bus in the order they come in.

SUMMARY OF THE INVENTION

The switching module according to the invention is characterised in that a unique address is allocated to each crosspoint switch and in that this crosspoint switch comprises:

a request output for sending a request signal to the allocation means in response to the presence of a packet to be transmitted, and a detection circuit connected to the output bus, for detecting empty packets on the output bus which carry the address of the relevant crosspoint switch, and which writing circuit is suitable for writing packets, under the control of the detection circuit, into the empty packets carrying the detected address; and in that allocation means connected to the output bus generate empty packets carrying the address of a crosspoint switch and comprise:

recording means for recording and subsequently resetting the request signal of each crosspoint switch within a packet interval, a First-In-First-Out queue store having a data input for applying thereto representations of crosspoint switch addresses, a packet generator for deriving addresses from the representations of the queue store and providing the empty packets with these addresses.

The allocation means record the request signals from which the representations of the unique crosspoint switch addresses are derived. These address representations are recorded by the First-In-First-Out queue store in the order in which they have been recorded by the recording means and are subsequently read out in this order by the packet generator. In this order the packet generator provides empty packets with the addresses, realising a good approximation of the 'strict FIFO' behaviour of the switching module. At this stage a minimum deviation from the 'strict FIFO' behaviour may occur in that per packet interval the request signal at a first input is processed at an earlier instant than the request signal at a second input if the first input becomes high at a later instant than the second input of the recording means. This is caused by the order in which the recording means record the request signals. However, all request signals at the inputs of the recording means are written within the same packet interval. At the same time, request signals applied to the input of the recording means one packet interval later are all processed later than the recording signals that have been applied to the inputs at least one packet interval earlier.

BRIEF DESCRIPTION OF THE DRAWING

The invention and its advantages will now be further explained with reference to the drawings in which.

DETAILED DESCRIPTION

Figure 1:
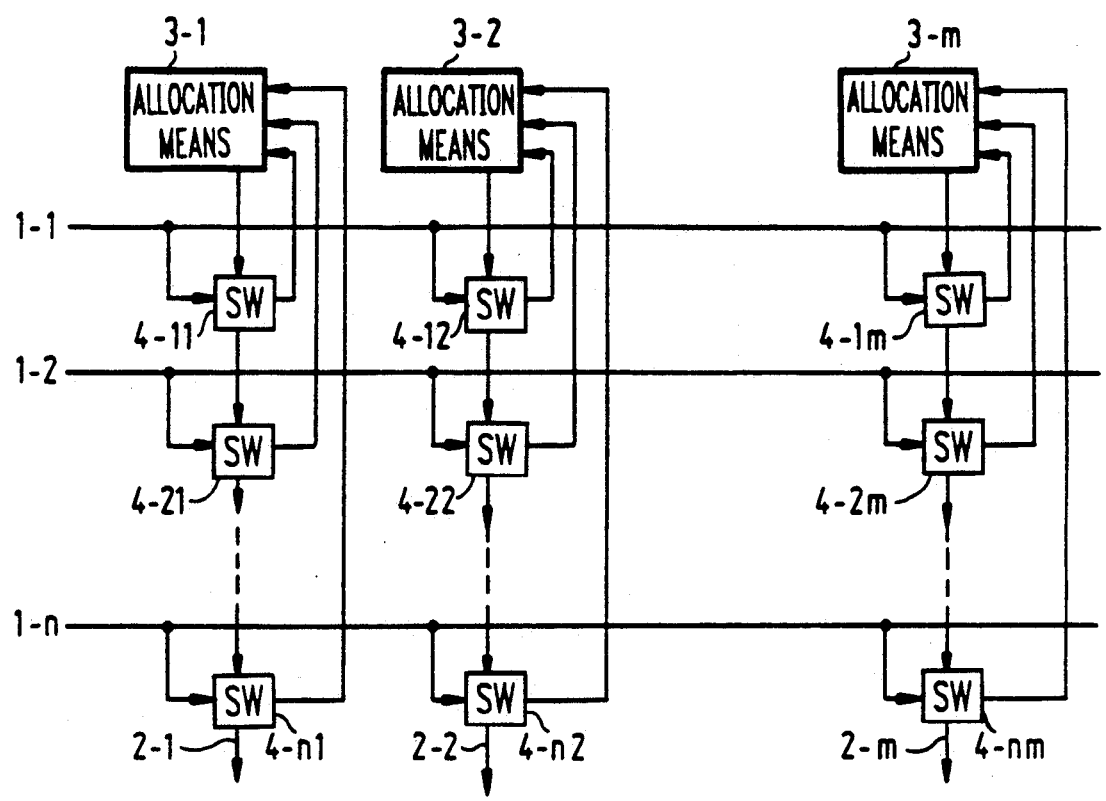
FIG. 1: shows a diagram of the switching module comprising crosspoint switches and allocation means according to the invention.

In FIG. 1 a switching module is shown having n input buses referenced 1—1 to 1-n and m output buses, referenced 2-1 to 2-m.

For each connection between one of the n incoming buses (i) and one of the m outgoing buses (j) each time a crosspoint switch 4-ij is used, whose input is connected to the relevant incoming bus and whose first output is connected to the relevant outgoing bus. These crosspoint switches are used for routing the digital information through the network. Each crosspoint switch 4-ij has a unique address and also a request output which is connected to allocation means 3-j. Once a crosspoint switch 4-ij has received a digital information packet, the crosspoint switch requests allocation means 3-j an empty packet. Per packet interval the allocation means 3-j examine whether the crosspoint switches 4-lj to 4-nj have requested an empty packet. If they have, the allocation means 3-j send an empty packet carrying the address of the crosspoint switch concerned to the crosspoint switches in the order of the crosspoint switches.

Figure 2:
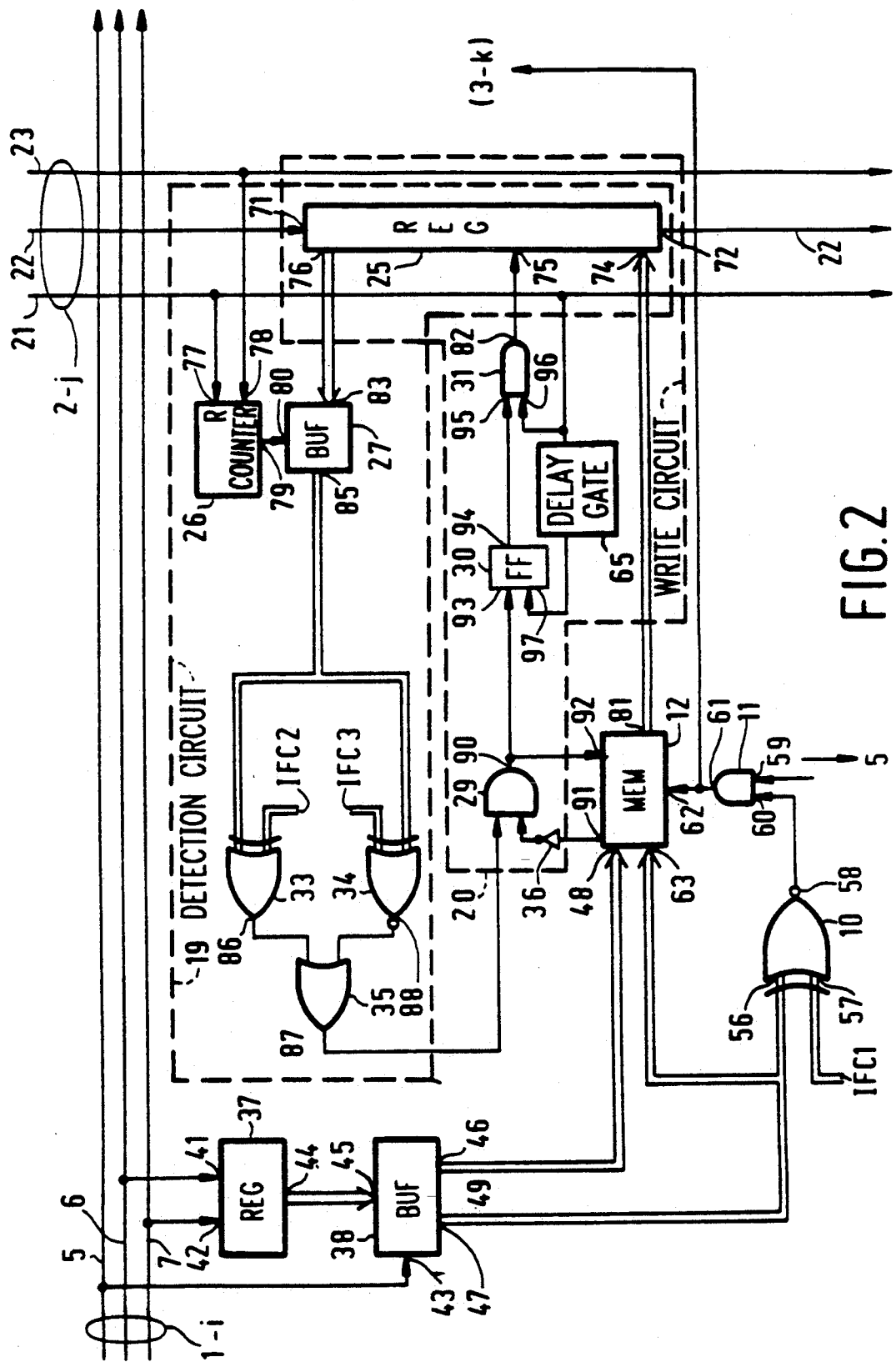
FIG. 2: shows a circuit diagram of a crosspoint switch according to the invention.

In FIG. 2 is shown an embodiment of a crosspoint switch according to the invention.

The input bus 1-i comprises three lines 5, 6 and 7 of which line 5 is used for the packet sync signal for the packets to be sent over line 6. These packets consist of an address field and a data field. The line 7 conveys the bit sync clock signal over line 6.

The lines 6 and 7 are connected to the respective data input 41 and clock input 42 of register 37. The packets are written into the register 37 in a bit serial fashion.

The packet sync line 5 is connected to the write-enable input 43 of buffer 38. The data input of buffer 38 is connected in parallel to the data output 44 of register 37, so that a packet in register 37 is written in parallel into the buffer 38 in dependence on the packet sync signal on line 5.

A first data output 46 of buffer 38 is connected to data input 48 of buffer store 12 for writing in parallel a packet data field into buffer store 12; the second data output 47 of buffer 38 is connected to data input 63 of buffer store 12 for writing a packet address field into buffer store 12. The data output 47 is likewise connected to input 56 of comparator 10. A predetermined information word IFC1 corresponding with an output bus 2-j is applied to the other input 57 of comparator 10.

The output 58 of comparator 10 is connected to input 60 of AND gate 11 whose input 59 is connected to line 5 of bus 1-i for packet synchronization. Output 61 of AND gate 11 is connected to the write-enable input 62 of buffer store 12. Output 61 likewise constitutes the request output of the crosspoint switch.

Comparator 10 compares the address field at input 56 to the information word IFC1 applied to input 57 of comparator 10 and if they match, the write-enable input 62 of buffer store 12 will be activated via AND gate 11. The result is, that the address field and the relevant data field are written in parallel into buffer store 12 through the respective data inputs 48 and 63. A request signal having a signal value "1" is likewise produced via output 61 of AND gate 11. This request signal is applied to the allocation means 3-k to express that a packet to be transferred has been written into the buffer store 12. By means of this request signal the allocation means 3-k are further requested an empty packet, which empty packet is specifically intended for this crosspoint switch. The processing of the request signal by the allocation means 3-k is explained with reference to the drawing FIGS. 3 up to and including 7. If comparator 10 ascertains that the address field and the information word IFC1 form a mismatch, the write-enable input 62 of buffer store 12 will not be activated. This is the case with packets that do not need switching from bus 1-i to bus 2-j on the basis of their destination. The address field and the data field at the respective data inputs 48 and 63 of buffer store 12 are now discarded.

The packet written into buffer store 12 is switched to the output bus 2-j by means of a detection circuit 19 and a writing circuit 20. The detection circuit is used for ascertaining when an empty packet specifically intended for this crosspoint switch is present on bus 2-j. This is the case when the empty packet contains the unique crosspoint switch address or when the empty packet has an empty packet code IFC3 to indicate that the empty packet may be used by any crosspoint switch. The writing circuit 20 is used for writing then a packet from buffer store 12 into the empty packet. The output bus 2-j has three lines 21, 22 and 23, of which line 21 is used for transferring the packet sync signal for the packets to be sent over the packet line 22. Line 23 transports the clock signal bit synchronization of the packets sent over line 22.

Serial-to-parallel register 25 comprises a serial data input 71 connected to packet line 22, a parallel data input 74 connected to data output 81 of buffer store 12, a write-enable input 75 connected to output 82 of AND gate 31, a serial data output 72 connected to the packet line 22 and a parallel data output 76 connected to data input 83 of buffer 27.

The packet sync line 21 is connected to reset input 77 of counter 26 and line 23 to clock input 78 of counter 26. The output 79 of counter 26 is connected to write-enable input 80 of buffer 27.

The parallel data output 85 of buffer 27 is connected to an input of comparator 33 and an input of comparator 34. A predetermined address code IFC2, which is the unique address corresponding with the crosspoint switch, is applied to a second input of comparator 33. A predetermined information word, which is equal to the empty packet code IFC3, is applied to the second input of comparator 34. The outputs 86 and 88 of the respective comparators 33 and 34 are connected each to an input of OR gate 35. Output 87 of OR gate 35 is connected to an input of AND gate 29. Furthermore, queue-empty output 91 of buffer store 12 is connected to a second input of AND gate 29 by means of invertor 36. The output 90 of AND gate 29 is connected to the read-enable input 92 of buffer store 12 and set input 93 of FLIP-FLOP 30.

The reset input 97 of FLIP-FLOP 30 is connected to packet sync line 21 by means of a delay gate 65. AND gate 31 has two inputs 95 and 96 of which input 95 is connected to output 94 of FLIP-FLOP 30 and the other input 96 is connected to packet sync line 21.

The packets on line 22 are transferred to data input 71 of serial/parallel register 25 in a bit serial mode. The counter 26 counts the number of bits starting from the packet sync pulse, which are applied in the serial mode to serial/parallel register 25, until the complete address field of a packet has been written into serial/parallel register 25. Subsequently, the address field is written in parallel into buffer 27 under the control of a write-enable signal on write-enable input 80 of buffer 27. Comparator 33 compares the address field in buffer 27 to the address code IFC2. If the address field on data output 85 of buffer 27 matches the address code IFC2 and buffer store 12 likewise contains a packet, the output signal of AND gate 29 will activate the read-enable input 92 of buffer store 12 for the next packet in buffer store 12 to be read out. A packet will also be read from buffer store 12 if the address field in buffer 27 matches the empty-packet code IFC3 at comparator 34. In both cases, so if the address field in buffer 27 matches the address code IFC2 or the empty-packet code IFC3, the output signal of AND gate 29 will be applied to set-input 93 of FLIP-FLOP 30 so that a take-over signal will appear at output 94 of FLIP-FLOP 30.

This take-over signal at output 94 of FLIP-FLOP 30 and a packet sync pulse at input 96 of AND gate 31 activate write-enable input 75 of serial/parallel register 25. The delay gate 65 connected to reset input 97 of FLIP-FLOP 30 presents a delay of about a half clock pulse. This delay avoids that the take-over signal at output 94 of FLIP-FLOP 30 has changed its value before the write-enable input 75 of serial/parallel register 25 has been activated by means of the take-over signal and of a packet sync pulse at the respective inputs of AND gate 31. At the instant when the packet bit positions in serial/parallel register 25 match the packet bits at the parallel data input 74, the packet at output 81 of buffer store 12 will be written in parallel into register 25. This achieves that a packet on an incoming bus is transferred to an outgoing bus.

Figure 3:
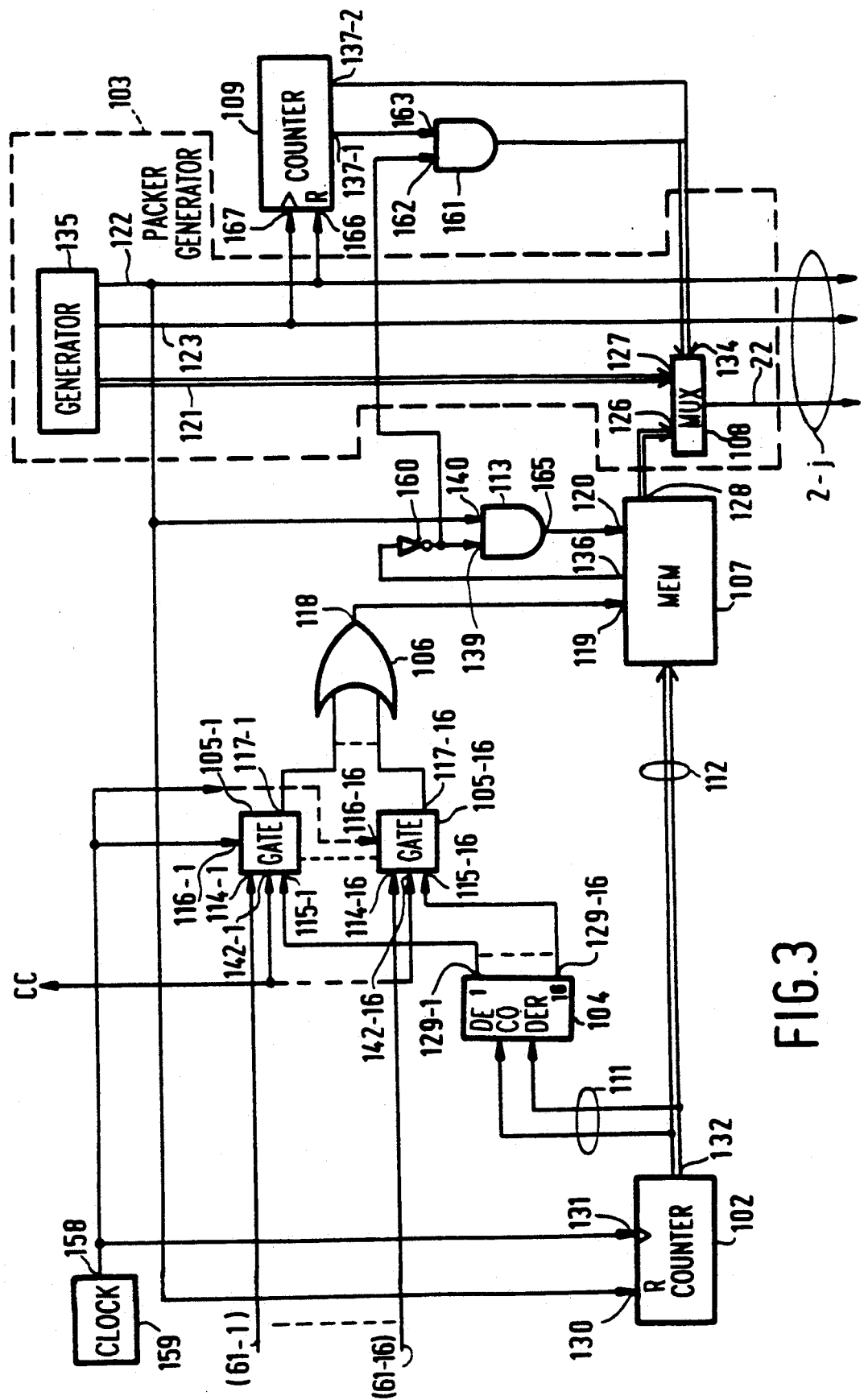
FIG. 3: shows a first embodiment of the allocation means according to the invention.

FIG. 3 shows a first embodiment of the allocation means 3-k. The allocation means comprise a packet generator 103 for transferring empty packets having a unique address to an output bus 2-j under the control of a counter 109. In this first embodiment the empty packets may be intended for 16 different crosspoint switches. The packet generator 103 comprises a generator 135 for supplying empty packets to data input 127 of a multiplexer 108 by means of the packet line 121. The output side of generator 135 is connected to packet sync line 122 and clock line 123 in addition to packet line 121. Packet sync line 122 and clock line 123 correspond with packet sync line 21 and clock line 23, respectively, in FIG. 2.

The multiplexer 108 in the packet generator 103 further has a data input 126 directly connected to data output 128 of a FIFO queue buffer 107 for deriving from this data output 128 a unique address and providing an empty packet coming from generator 135 with this address. Multiplexer 108 further has a write-enable input 134, connected to the output of AND gate 161 and to output 137-2 of counter 109. Multiplexer 108 likewise has a serial data output for transferring the addressed empty packet to packet line 22.

The allocation means also include a 16-counter 102 whose output 132 is connected to a decoder 104 over a bus 111 and to a queue buffer 107 over a bus 112. Counter 102 further has a reset input 130 connected to line 122 for the packet sync signal and a clock input 131 connected to clock output 158 of clock generator 159.

Furthermore, the allocation means 3-k include sixteen gate circuits 105-1, ..., 105-16 jointly constituting the recording means. Each gate circuit has an input 114, an input 115, an input 116, an input 142 and an output 117. An embodiment of a gate circuit 105-i of this type will be described with reference to FIG. 4. The inputs 142-1, ..., 142-16 are connected to a central controller (not shown) for continuously receiving a signal having the value "1".

The inputs 114-1, ..., 114-16 form the request inputs which are connected each to a request output 61 of the 16 respective crosspoint switches (see FIG. 2). The inputs 115-1, 115-16 are connected to the respective outputs 129-1, ..., 129-16 of decoder 104. The inputs 116-1, ..., 116-16 are connected all to output 158 of clock generator 159. The outputs 117-1, ..., 117-16 are connected to OR gate 106 whose output 118 is connected to write-enable input 119 of queue buffer 107. Queue buffer 107 further has a queue-empty output 136 connected via invertor 160 to input 139 of AND gate 113. A second input 140 of AND gate 113 is connected to packet sync line 122, output 165 of AND gate 113 being connected to read-enable input 120 of queue buffer 107. AND gate 161 has an input 162 connected to the output of the invertor 160 and an input 163 connected to the output 137-1 of counter 109. Counter 109 has outputs 137-1, ..., 137 ... x, which number of outputs corresponds with the number of bytes in an empty packet. In response to bytes appearing on the packet line 121, counter 109 successively assigns the value "1" to the outputs 137-1, ..., 137-x for the duration of a byte interval.

Figure 5:
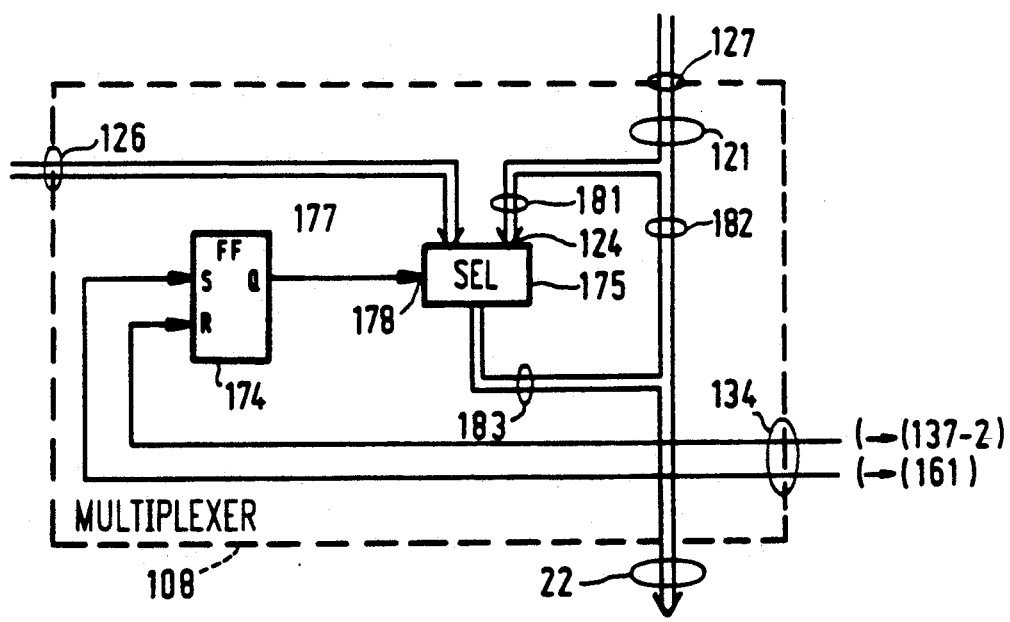
FIG. 5: shows an embodiment of the multiplexer for inserting the address of a crosspoint switch into an empty packet.

In FIG. 3 no more than two outputs 137-1 and 137-2 are represented because only these two outputs are important for explaining this Figure and FIG. 5 to be discussed in the sequel. Counter 109 has a reset output 166 connected to the packet sync line 122 and has a clock input 167 connected to clock line 123.

Clock generator 159 simultaneously applies a clock signal to clock input 131 of counter 102 and to an input 116-i of gate circuit 105-i. In response to this clock signal the counter 102 generates a count matching the unique address of the node switch that has applied a request signal through request input 114-i to gate circuit 105-i. The 16-counter 102 restarts counting once it has received a packet sync signal on its reset input 130. The unique address represented by the count on output 132 of counter 102 is applied to decoder 104 over bus 111 and to queue store 107 over bus 112. Depending on the address on its input, decoder 104 transfers a binary signal having the value "1" to one of its 16 outputs, for example, 129-i, and a signal having the value "0" to the remaining outputs. This value "1" signal is applied to an input 115-i of the gate circuit 105-i. If also the binary request signal on input 114-i has the value "1", a binary signal having the value "1" is applied to the write-enable input 119 of queue store 107 via output 117-i of the gate circuit 105-i and OR gate 106 after the clock signal of clock generator 159 at input 116-i. In response to this write-enable signal the address at output 132 of counter 102 is written into the queue store 107 via bus 112.

When a packet sync pulse appears on line 122 and at the same time queue store 107 contains a unique address, read-enable input 120 of queue store 107 is activated by means of AND gate 113. In response, the address from queue store 107 is applied to data input 126 of multiplexer 108. The counter 109 starts counting after receiving a packet sync pulse at its reset input 166. In response to this pulse, output 137-1 of counter 109 applies a signal having a value "1" to input 134 of multiplexer 108 by means of AND gate 161 because queue store 107 contains an address, so that the address in queue store 107 is transferred to data line 22 via data input 126. Thereafter, the signal at input 134 assumes the value "0" under the control of counter 109, so that through data input 127 of multiplexer 108 the remaining part of the empty packet originating from generator 135 is transferred to data line 22 of output bus 2-j. In this manner the allocation means have produced an empty packet carrying an address that matches the unique address of the node switch which has requested this empty packet by means of a request signal. If the queue store 107 does not contain a unique address matching a count, that is, if no request signal of a node switch has been detected on the lines 101-1, ..., 101-16, an empty packet having an empty-packet code IFC3 is transferred to data line 122 of output bus 2-j through data input 127 of multiplexer 108.

It should further be observed that if the time interval between two successive packet sync pulses is equal to Tp, the clock signal originating from clock generator 159 has a time interval Td which is shorter than Tp/16. Consequently, the request signals of all 16 node switches can be examined within one time interval Tp, in the manner described above. It is also possible to generate during any interval Tp an empty packet carrying a unique address of one of the node switches.

Figure 4:
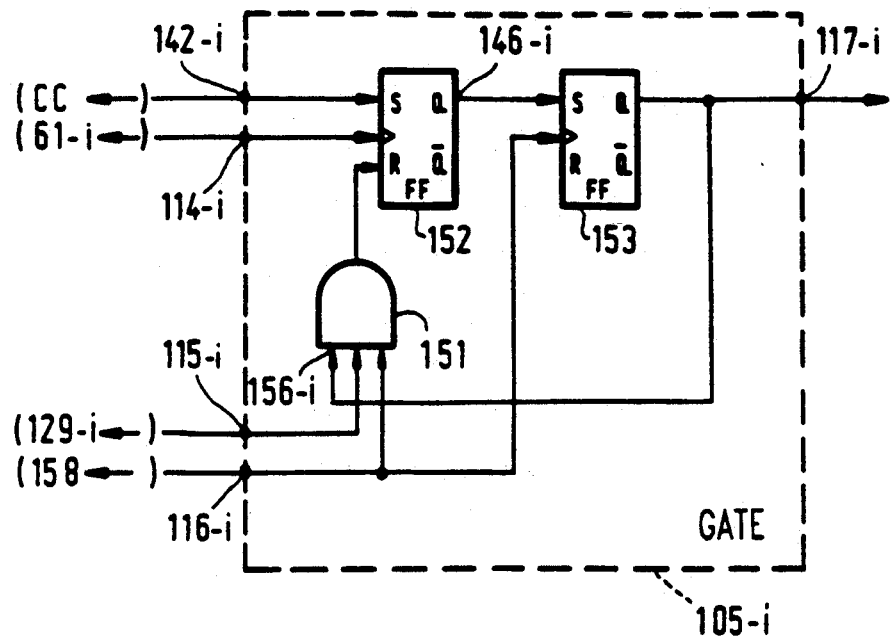
FIG. 4: shows an exemplary embodiment of a gate circuit of the recording means in the allocation means as shown in FIG. 3.

FIG. 4 shows an embodiment of a gate circuit 105-i which forms part of the recording means as represented in FIG. 3. The gate circuit 105-i comprises two FLIP-FLOPs 152 and 153 and an AND gate 151. The AND gate 151 has an input 115-i connected to output 129-i of decoder 104, an input 116-i connected to output 158 of clock generator 159 and has an input 156-i connected to output 117-i of FLIP-FLOP 153. The output of AND gate 151 is connected to the reset input of FLIP-FLOP 152. This FLIP-FLOP 152 has also a set-input 142-i connected to a central controller CC (not shown) for receiving a binary signal having the value "1", a clock input 114-i connected to output 61-i of a single node switch, and has an output 146-i connected to the set-input of FLIP-FLOP 153. FLIP-FLOP 153 has a clock input to which output 158 of clock generator 159 is connected. The output 117-i of FLIP-FLOP 153 constitutes the output of the gate circuit 105-i.

The output 146-i of FLIP-FLOP 152 takes over the value "1" on its set-input 142-i once a request signal originating from a node switch has been applied to its clock input 114-i. At the next clock signal from the clock generator 159 the binary signal at output 117-i of FLIP-FLOP 153 assumes the value "1" which subsequently activates write-enable input 119 of queue store 107 via the OR gate 106 represented in FIG. 3. FLIP-FLOP 152 is reset via AND gate 151 once the signal at output 117-i has assumed the value "1", a clock signal from clock generator 159 has been received at input 116-i and the signal at output 129-i of decoder 104 has assumed the value "1" by means of the count signal from counter 102. After the successive clock signal at the clock input of FLIP-FLOP 153, the binary signal at output 117-i of the gate circuit 105-i has the value "0".

In FIG. 5 an embodiment of the multiplexer 108 is represented, while it is assumed that the address field of a packet contains 4 bits. The packet line 121 for transporting 8 bits in parallel splits up into two lines 181 and 182 each transporting 4 bits, line 181 being connected to input 124 of selector 175.

Selector 175 has a data output to which line 183 is connected for transporting 4 bits in parallel. The line 183 then merges with line 182 into packet line 22. The selector further has a data input 126 to which the output 128 of queue store 107 is connected.

Multiplexer 108 further includes a FLIP-FLOP 174 which has a set-input connected to the output of AND gate 161 (see FIG. 3), a reset-input connected to output 137-2 of counter 109, and an output 177 connected to selecting input 178 of selector 175. As has been stated with reference to FIG. 3, output 137-1 of counter 109 assumes the bit value "1" once a packet sync pulse has been received at reset input 166 of counter 109. This signal value is applied through AND gate 161 to the set input of FLIP-FLOP 174, which in response thereto applies a signal having the bit value "1" to selecting input 178 of selector 175. In that case data input 126 is connected to the data output of selector 175 as a result of which an address is transferred from data output 128 of queue store 107 to line 183. At the second byte interval following the packet sync pulse, output 137-2 of counter 109 (cf. FIG. 3) assumes the bit value "1" so that FLIP-FLOP 174 is reset. In response thereto, the signal at selecting input 178 changes to bit value "0" so that now the data input 124 becomes connected to the data output of the selector 175 leading to the separate packet information on line 181 being transferred to line 183.

Figure 6:
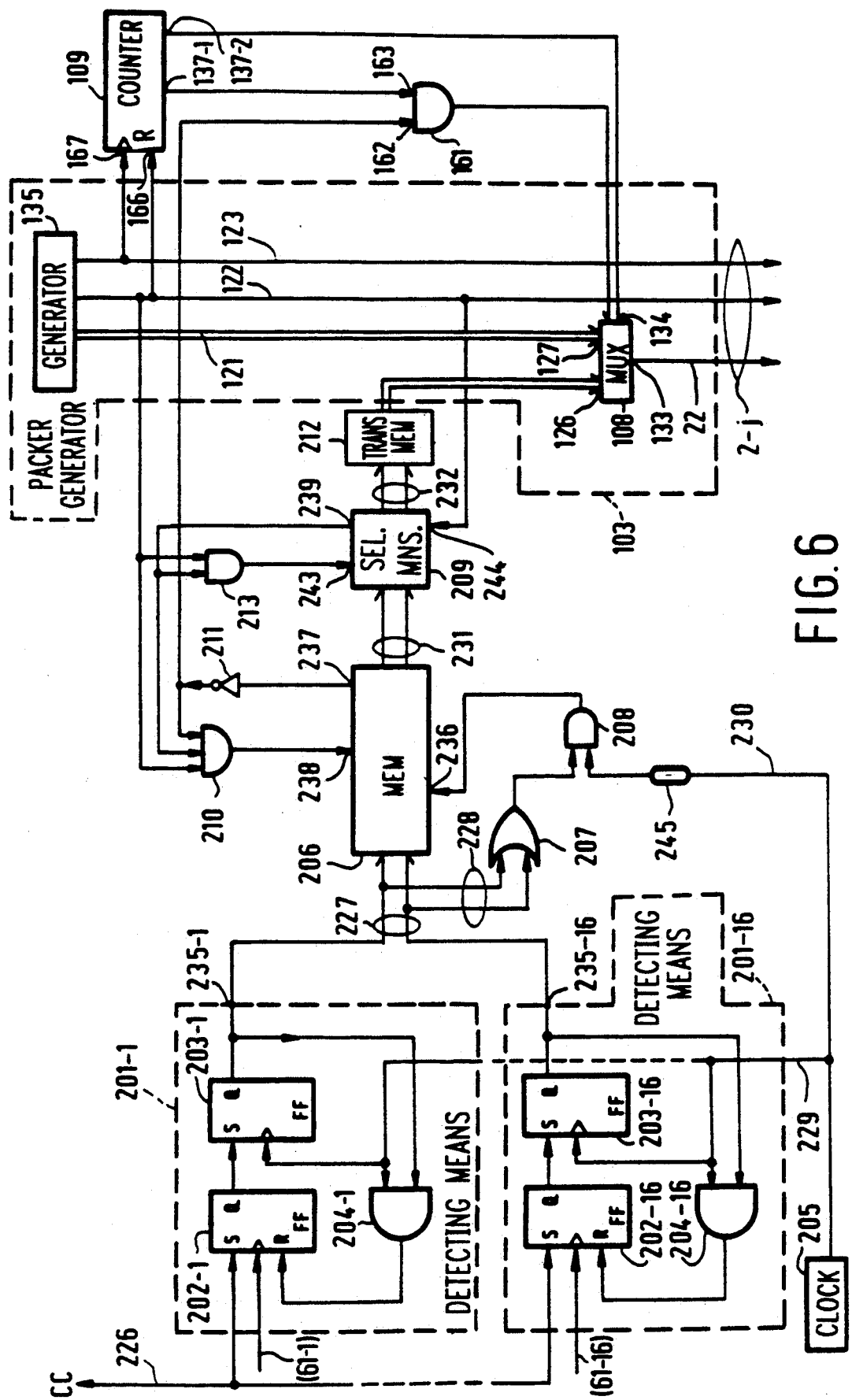
FIG. 6: shows a second embodiment of the allocation means.

FIG. 6 shows a diagram of a second embodiment of the allocation means 3-k. The elements the FIGS. 6 and 3 have in common, are denoted by the same reference characters.

The allocation means comprise detecting means 201-1, ..., 201-16 jointly forming the recording means, for detecting a request signal at the 16 request outputs 61-1, ..., 61-16 of the 16 node switches. The allocation means further include a FIFO queue store 206 whose data input is connected to the respective outputs 235-1, ..., 235-16 of the detecting means 201-1, ..., 201-16.

The data output of the queue store 206 is connected to the data input of the selecting means 209 by means of data bus 231. The data output of the selecting means 209 is connected to data input 126 of multiplexer 108 via data bus 232 and translation memory 212.

The detecting means 201-i (i=1, ..., 16) comprise a FLIP-FLOP 202-i, a FLIP-FLOP 203-i and an AND gate 204-i.

FLIP-FLOP 202-i has a set-input connected to a central controller CC (not shown) for receiving a signal having the value "1", it has a clock input connected to the request output 61 of a node switch 4-ik and a reset-input connected to the output of AND gate 204-i.

The output of FLIP-FLOP 202-i is connected to the set-input of FLIP-FLOP 203-i. This FLIP-FLOP 203-i has a clock input connected to clock generator 205 by means of a clock line 229 and an output constituting the output 235-i of the detecting means 201-i. The AND gate 204-i has two inputs one of which being connected to this output of FLIP-FLOP 203-i and the other input being connected to the clock generator 205 by means of clock line 229.

The outputs 235-1, ..., 235-16 of the detecting means 201-1, ..., 201-16 are connected to the data input of queue store 206 by means of a data bus 227 and to an OR gate 207 by means of a data bus 228. The output of the OR gate 207 is connected to one of the two inputs of AND gate 208, whose other input is connected to clock generator 205 by means of a delay element 245 and clock line 230. The output of AND gate 208 is connected to write-enable input 236 of the queue store 206.

Figure 7:
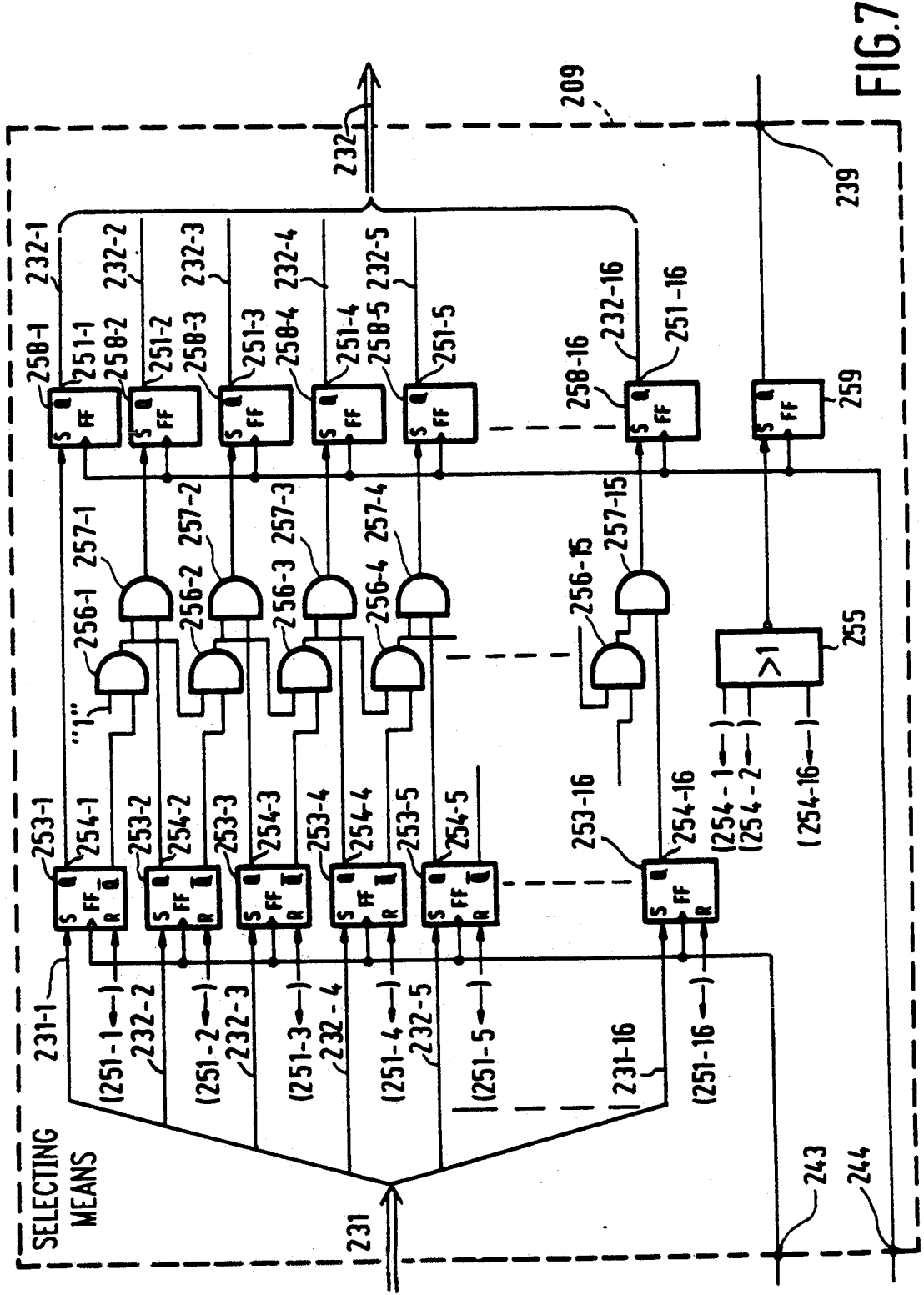
FIG. 7: shows an embodiment of selecting means in the allocation means as shown in FIG. 6.

The selecting means 209, of which FIG. 7 represents an embodiment, further have an input 244 to which the packet sync signal line 122 is connected, and a ready-signal output 239 connected to an input of AND gate 210 and to an input of AND gate 213. The two AND gates 210 and 213 have inputs to which line 122 is connected. AND gate 210 further has an input to which the queue-empty output 237 of queue store 206 is connected via invertor 211, and has an output connected to read-enable input 238 of queue store 206. The output of AND gate 213 is connected to write-enable input 243 of the selecting means 209.

Each output of the FLIP FLOPs 202-1, ..., 202-16 will take over the signal at its respective set input if a request signal from the concerning request output 61-i (i=1 , ... 16) (cf. FIG. 2) of the node switch 4-ik is available.

The clock generator 205 applies a clock signal in parallel to the clock inputs of the FLIP FLOPs 203-1 , ..., 203-16 in a time slot that is smaller than the smallest expected packet interval of the packets transported over the input buses 1-i , ..., 1-n (cf. FIG. 1). Herewith is achieved that while the signal values at the outputs of the FLIP FLOPs 202-1 , ..., 202-16 are taken over within this time slot by the outputs 235-1 , ..., 235-16 of the FLIP FLOPs 203-1 , ..., 203-16, these signal values will not change. Meanwhile, the clock signal of the clock generator 205 simultaneously resets the FLIP FLOPs 202-1 , ..., 202-16.

The request signals at the outputs 235-1 , ..., 235-16 of the detecting means 201-1 , ..., 201-16 form a 16-bit information word which is applied to the data input of the queue store 206 by means of data bus 227. This information word is a representation of the unique addresses of the crosspoint switches. The unique addresses will be derived from this information word in the manner to be described hereinafter.

The information word is also applied to OR gate 207. If at least one of the signal values at the outputs 235-1 , ..., 235-16 has the value "1", the moment the clock generator 205 over clock line 230 applies a clock signal to an input of AND gate 208, the write-enable input 236 of queue store 206 will be activated to write the information word into the queue store. By means of the delay element 245 on clock line 230 it is achieved that the write-enable signal does not appear at write-enable input 236 until the signals at the outputs 235-1 , ..., 235-16 of the detecting means 201-1 , ..., 201-16 change no longer.

If AND gate 210 simultaneously receives at its inputs a packet sync signal from line 122, a ready-signal from output 239 of selecting means 209 and a queue-empty signal from the output 237 of queue store 206, read-enable input 238 of queue store 206 will be activated for applying an information word to the data input of the selecting means 209. An information word, which is already available on data bus 231 before input 238 of queue store 206 is activated, is taken over by the selecting means 209 via a write-enable signal on their write-enable inputs 243, once at the inputs of AND gate 213 the packet sync signal from line 122 and the ready-signal from output 239 are received simultaneously.

The selecting means 209 examine in a fixed order the request signals in the 16-bit information word and select the information bits having the signal value "1". The selecting means 209 thereafter generate second 16-bit information words which correspond with the position of each of these information bits, and which information words are applied to translation memory 212 over data bus 232 once a packet sync signal has appeared at input 244 of the selecting means 209 over line 122.

Such a second 16-bit information word on data bus 232 has only a single bit having the value "1" and the position of this bit in this second 16-bit information word corresponds with the position of the selected information bit in the 16-bit information word on data bus 231. Translation memory 212 generates, in response to the applied 16-bit information word on data bus 232, a unique 4-bit information word corresponding with the unique address of the crosspoint switch from which the original request signal comes, is applied to the data input 126 of multiplexer 108. The further processing of the address corresponds with the description of the FIGS. 3 and 5 which is dedicated thereto. Since the translation means 212 can be arranged with prior art means and in a likewise prior art manner as a Read Only Memory (ROM), the arrangement of a similar translation memory will not be further discussed in this context.

In the manner described above the selecting means 209 and the translation memory 212 generate to each bit in the 16-bit information word on data bus 231 having the value "1", a dedicated unique address. Once all the bit values in this 16-bit information word have been examined, the ready-signal output 239 of selecting means 209 applies a signal having the value "1 " to AND gates 210 and 213.

FIG. 7 shows an embodiment of the selecting means 209 represented in FIG. 6. The selecting means 209 comprise 16 FLIP FLOPs 253-1 , ..., 253-16 connected through the AND gates 256-1 , ..., 256-15 and 257-1 , ..., 257-15 to FLIP FLOPs 258-1 , ... 258-16. The FLIP FLOPs 253-1 , ..., 253-16 have each a set input to which a data line 231-i (i=1 , ..., 16) is connected, which data lines 231-1 , ..., 231-16 jointly form the data bus 231. The FLIP FLOPs 253-1 , ..., 253-16 further have each a reset input to which the outputs 251-1 , ..., 251-16 of the respective FLIP FLOPs 258-1 , ..., 258-16 are connected, and have each a clock input connected to the write-enable input 243 of selecting means 209. The outputs 251-1 , ..., 251-16 of FLIP FLOPs 258-1 , ..., 251-16 are also connected to the respective data lines 232-1 , ..., 232-16 which jointly form data bus 232.

The non-inverted output 254-1 of FLIP FLOP 253-1 is connected direct to the set input of FLIP FLOP 258-1, which is contrary to the non-inverted outputs 254-2 , ..., 254-16 of the FLIP FLOPs 253-2 , ..., 253-16 which are connected to the set input of the FLIP FLOPs 258-2 , ..., 258-16 by means of the respective AND gates 257-1 , ..., 257-15.

The further input of AND gate 257-j (j=1 , ..., 15) is connected to the output of AND gate 256-j. The inverted outputs of the FLIP FLOPs 253-1 , ..., 253-15 are connected to one of the two inputs of the respective AND gates 256-1 , ..., 256-15. At the other input of AND gate 256-1 a signal having the value "1 " is available and the further inputs of AND gates 256-2 , ... 256-15 are connected to the outputs of the respective AND gates 256-1 , ..., 256-14.

At the same time the non-inverted outputs 254-1 , ..., 254-16 of the FLIP FLOPs 253-1 , ..., 253-16 are connected to the set input of FLIP FLOP 259 by means of gate 255. FLIP FLOP 259 has a clock input to which packet sync line 122 is connected by means of input 244 of selecting means 209 (cf. FIG. 6), and has an output constituting the ready-signal output 239 of the selecting means 209. Line 122 is likewise connected to the inputs of the FLIP FLOPs 258-1 , ..., 258-16 through input 244.

Once a clock signal appears at the clock inputs of the FLIP FLOPs 253-1 , ..., 253-16 through write-enable input 243, the complete 16-bit information word on the data lines 231-1 , ..., 231-16 is taken over by the outputs 254-1 , ..., 254-16 of the FLIP FLOPs 253-1 , ..., 253-16.

The gates 256-1 , ..., 256-15 and 257-1 , ..., 257-15 connect the FLIP FLOPs 253-1 , ..., 253-16 to the FLIP FLOPs 258-1 , ..., 258-16 in a manner enabling the outputs 254-1 to 254-16 of FLIP FLOPs 253-1 , ..., 253-16 in this order to transfer any signal value "1 " to the output bus 232 by means of a FLIP FLOP 258-i (i=1,..., 16). Thus, output 254-1 is enabled first and output 254-16 is enabled last to transfer any signal value "1" to data bus 232.

Let us assume that the first output which has a signal value "1" is the output 254-i of FLIP FLOP 253-i (i=1,..., 16).

The FLIP FLOPs 258-j (j<i) obtain through AND gates 257-j a signal value "0" at their set inputs and the FLIP FLOPS 258-k (k>i) obtain through the inverted output of FLIP FLOP 253-i and through AND gates 256-l (l≧i) and AND gates 257-l (l≧i) the signal value "0" at their set inputs. Only to the set input of FLIP FLOP 258-i will a signal having a value "1" be applied, which signal value originates from output 254-i of FLIP FLOP 253-i. At the next clock signal at clock input 243 a signal having the value "1" will appear on data line 232-i and a signal having the value "0" on the remaining lines 232-m (m=i). FLIP FLOP 253-i will simultaneously be reset by means of output 251-i.

Subsequently, in accordance with the manner described above, the next output 254-k (k>i), having a value "1" signal, will be interconnected to the set input of FLIP FLOP 258-k. In this fashion each output 254-i (i=1,..., 16) will successively be given the opportunity to transfer a 16-bit information word to data bus 232 while there is a signal value "1" on data lines 232-i and a signal value "0" on the remaining data lines.

The gate 255 to which all inputs 254-1,..., 254-16 of FLIP FLOPs 253-1,..., 253-16 are connected generates a signal having the value "1" at the set input of FLIP FLOP 259 once one or more outputs 254-i (i=1..., 16) has/have a signal having the value "1". As the next clock signal through input 244 of selector means 209 is applied to the clock input of the FLIP FLOP 259 a signal having the value "1" which is generated at the ready-signal output 239 of the selector means 209 will be applied to the AND gates 210 and 213 represented in FIG. 6. FLIP FLOP 258-i is simultaneously activated by this clock signal on clock input 244 to take over on its own output 251-i the latest signal having the value "1" at output 254-i.

Thereafter, the next information word is read onto the data input of the selector means 209 by the selector means 209 itself for a subsequent examination of the 16 request signals which jointly form the information word, upon which the above-described cycle is reiterated.

We claim:

1. Digital data packet switching module, comprising a plurality of input buses and at least one output bus, crosspoint switches connecting each individual input bus to the output bus, each crosspoint switch comprising a writing circuit that is connected to the output bus to write packets into empty packets on the output bus, and allocation means for solving access conflicts between packets intended to be transferred to the same output bus within the same packet interval, characterised in that a unique address is allocated to each crosspoint switch and in that this crosspoint switch comprises:

a request output for sending a request signal to the allocation means in response to the presence of a packet to be transmitted, and a detection circuit connected to the output bus, for detecting empty packets on the output bus which carry the address of the relevant crosspoint switch, and which writing circuit is suitable for writing packets, under the control of the detection circuit, into the empty packets carrying the detected address;

and in that allocation means connected to the output bus generate empty packets carrying the address of a crosspoint switch and comprise:

recording means for recording and subsequently resetting the request signal of each crosspoint switch within a packet interval, a First-In-First-Out queue store having a data input for applying thereto representations of crosspoint switch addresses and a data output, and a packet generator for deriving addresses from the representations of the queue store and providing the empty packets with these addresses.

2. Switching module as claimed in claim 1, characterised in that the recording means sequentially record the request signals, in that the allocation means comprise a counter for applying a count to the data input of the queue store in parallel with the recording of one of the request signals, which queue store has a write-enable input to enable the queue store to change to the write condition in dependence on the request signal, and in that the packet generator has a direct connection to the data output of the queue store to receive the count.

3. Switching module as claimed in claim 1, characterised in that the recording means record a data word containing the request signals from the crosspoint switches, which data word forms representations of the crosspoint switch addresses, and in that the packet generator comprises a translation memory connected to the data output of the queue store which data memory, in dependence on the data word, generates addresses represented by this data word.

* * * * *